R. E. BILLINGSLEY.
ROTARY PLOWSHARE.
APPLICATION FILED FEB. 2, 1920.
1,389,483.
Patented Aug. 30, 1921.
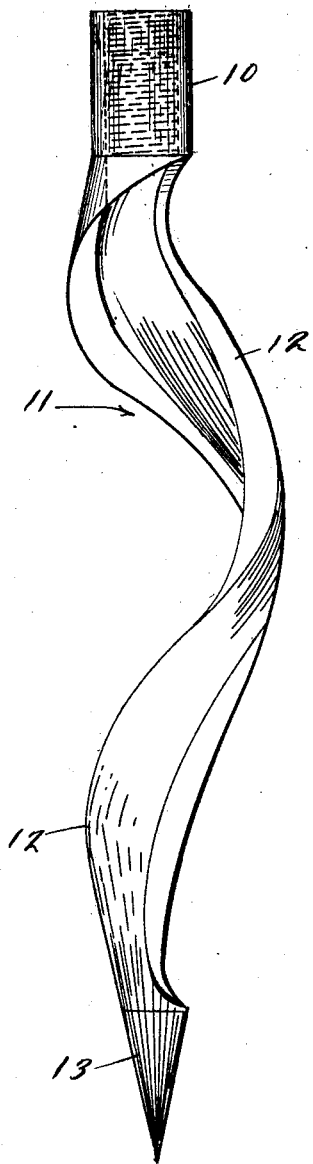
RENNIE E. BILLINGSLEY   INVENTOR
BY
Randolph L. Carter ATTORNEY

UNITED STATES PATENT OFFICE.

RENNIE E. BILLINGSLEY, OF SAN ANTONIO, TEXAS.

ROTARY PLOWSHARE.

1,389,483.  Specification of Letters Patent.  Patented Aug. 30, 1921.

Application filed February 2, 1920. Serial No. 355,752.

*To all whom it may concern:*

Be it known that I, RENNIE E. BILLINGSLEY, a citizen of the United States, residing at San Antonio, in the county of Bexar and State of Texas, have invented certain new and useful Improvements in Rotary Plowshares, of which the following is a specification.

This invention relates to improvements in plows, and has for one of its objects to provide a rotary earth working element so constructed that it will freely move through the earth and turn, pulverize, and disintegrate the same, thus accelerating the cultivation and effecting a material saving in time and labor.

Another object of the invention is to provide an earth working element which can be detachably connected to a means for rotating the same.

With these and other objects in view, the invention consists in certain novel features of construction as hereinafter shown and described and then specifically pointed out in the claims, and in the drawings illustrative of the preferred embodiment of the invention.

The figure represents an elevation of the improved implement.

Referring now more particularly to the drawing in connection with which like reference characters designate corresponding parts, the improved implement comprises a head portion 10 having means such as an internally threaded socket to adapt the implement to be attached to a rotating means, not shown. Extending from the head portion 10 and integral therewith, is a combined cutting, turning and disintegrating blade or body formed of a longitudinally directed cutting blade indicated as a whole at 11 and twisted into the form shown, with the twists relatively long.

The blade 11 is formed with a continuous cutting edge 12, and merges at the end opposite to the head 10 into an integral conical point 13.

The twisted portion is in long curves and the intermediate portion extends laterally, so that when the implement is rotated it contacts with and effects a relatively large portion of the earth through which it is drawn.

The improved implement thus not only cuts through the earth as it advances, but turns the earth and thoroughly and effectually pulverizes and disintegrates it, and breaks up all lumps or clods and leaves the soil in the best possible condition for the reception of seeds or plants.

An implement constructed as herein illustrated and described performs a three fold function, of simultaneously turning the soil, pulverizing the soil, and cutting clods or roots embedded in the soil into small particles, and without increase of expense of construction and which readily adapts itself to different characters of soil.

Furthermore, owing to the velocity at which the devices are rotated when engaged with earth, the device will move comparatively freely through the same, thus reducing the tractive force required to draw the improved type of plow share through the earth.

What is claimed is—

1. An implement of the class described comprising a body formed with an attaching head at one end and a conical point at the other end with the portion between the head and point formed of a blade having a cutting edge and curved longitudinally and twisted to provide an open unobstructed space within the lines of the blade, the cutting edge of the blade projecting beyond the lines of the head and point, whereby the friction is reduced and the action extended laterally without increasing the size of the head or point.

2. An implement of the class described comprising a strip having a cutting edge and twisted longitudinally and curved laterally to provide an unobstructed interior and with an attaching head at one end and an earth penetrating point at the other end.

In testimony whereof I affix my signature hereto.

RENNIE E. BILLINGSLEY.